United States Patent
Kaneumi et al.

(10) Patent No.: US 8,377,187 B2
(45) Date of Patent: Feb. 19, 2013

(54) GRAFT COPOLYMER AND MOLD-RELEASING AGENT COMPRISING SAME AS ACTIVE INGREDIENT

(75) Inventors: Yoshiyama Kaneumi, Ibaraki (JP); Seiichiro Murata, Ibaraki (JP); Katsuyuki Sato, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 0 days.

(21) Appl. No.: 13/376,321

(22) PCT Filed: Jun. 3, 2010

(86) PCT No.: PCT/JP2010/059430
§ 371 (c)(1),
(2), (4) Date: Dec. 5, 2011

(87) PCT Pub. No.: WO2010/140651
PCT Pub. Date: Dec. 9, 2010

(65) Prior Publication Data
US 2012/0090504 A1    Apr. 19, 2012

(30) Foreign Application Priority Data

Jun. 4, 2009  (JP) ................. 2009-135008
Jun. 4, 2009  (JP) ................. 2009-135009

(51) Int. Cl.
  *B29C 33/62*  (2006.01)
  *B28B 7/36*   (2006.01)
  *B28B 7/38*   (2006.01)
  *C09K 3/00*   (2006.01)

(52) U.S. Cl. ..... 106/38.22; 106/2; 106/38.2; 525/326.2; 525/529; 570/126; 570/136; 570/138; 570/142

(58) Field of Classification Search ............ 106/2, 38.2, 106/38.22; 525/326.2, 529; 570/126, 136, 570/138, 142
See application file for complete search history.

(56) References Cited

U.S. PATENT DOCUMENTS 7,956,225 B2 *  6/2011  Sato et al. ............... 570/155
8,197,586 B2 *  6/2012  Kaneumi et al. ......... 106/38.22

FOREIGN PATENT DOCUMENTS

| JP | 52-036588 | 3/1977 |
| JP | 52-039587 | 3/1977 |
| JP | 55-133490 | 10/1980 |
| JP | 58-180597 | 10/1983 |
| JP | 59-166596 | 9/1984 |
| JP | 60-190309 | 9/1985 |
| JP | 60-193615 | 10/1985 |
| JP | 07-246624 | 9/1995 |
| WO | WO 2007/105633 A1 | 9/2007 |
| WO | WO 2009/151109 A1 | 12/2009 |
| WO | WO 2009/151110 A1 | 12/2009 |

OTHER PUBLICATIONS

International Preliminary Report on Patentability and Written Opinion from corresponding PCT application No. PCT/JP2010/059430 dated Jan. 26, 2012 (5 pgs).
International Search Report from corresponding PCT application No. PCT/JP2010/059430 dated Aug. 17, 2010 (2 pgs).

* cited by examiner

*Primary Examiner* — Anthony J Green
(74) *Attorney, Agent, or Firm* — Brinks Hofer Gilson & Lione

(57) ABSTRACT

Disclosed is a graft copolymer in which a polyalkylene glycol or an alkyl ether thereof is graft-copolymerized with a polyfluoro-1-alkene represented by the general formula: $C_nF_{2n+1}(CH_2CF_2)_a(CF_2CF_2)_bCH=CH_2$ (wherein n is an integer of 1 to 6, a is an integer of 1 to 4, and b is an integer of 1 to 3). The graft copolymer is an oligomer compound having a perfluoroalkyl group containing 6 or less carbon atoms, which is said to have low bioaccumulation potential, and having, when used as an active ingredient of a mold-releasing agent, mold release performance equivalent to that of a compound having a perfluoroalkyl group containing 8 or more carbon atoms.

12 Claims, No Drawings

GRAFT COPOLYMER AND MOLD-RELEASING AGENT COMPRISING SAME AS ACTIVE INGREDIENT

RELATED APPLICATION

This application is a 35 U.S.C. §371 national phase filing of International Patent Application No. PCT/JP2010/059430, filed Jun. 3, 2010, through which and to which priority is claimed under 35 U.S.C. §119 to Japanese Patent Application Nos. 2009-135009, filed Jun. 4, 2009 and 2009-135008, filed Jun. 4, 2009.

TECHNICAL FIELD

The present invention relates to a graft copolymer and a mold-releasing agent comprising the same as an active ingredient. More particularly, the present invention relates to a graft copolymer, and a mold-releasing agent comprising the same as an active ingredient and having excellent film-forming properties and mold releasability.

BACKGROUND ART

Currently, silicone oil, wax, talc, mica, tetrafluoroethylene resin, and other mold-releasing agents are used in the molding of polymeric materials, such as plastic materials and rubber materials, using molds. Although silicone oil, wax, etc., have excellent mold releasability, such mold-releasing agents are transferred to molded products, thereby impairing uniform coating properties, secondary processability, and other properties; in addition, durability is not sufficient. As for tetrafluoroethylene resin, the durability of mold release effect and secondary processability are satisfactory; however, it is necessary to perform bake treatment to form a film on the molding surface of a mold in the mold-release process, and the same treatment is required for reprocessing. Consequently, many processes are required.

In order to solve these defects, mold-releasing agents comprising a $C_4$-$C_{20}$ polyfluoroalkyl group-containing phosphate ester as one of their active ingredients are proposed (see Patent Documents 1 to 3). These mold-releasing agents exhibit excellent mold releasability and have a longer mold release life than conventional mold-releasing agents; however, due to the recent trend toward the more complicated shape of molded products, there is a demand for mold-releasing agents having much higher performance.

Meanwhile, polyfluoroalkyl phosphonates are also widely used as starting materials for the synthesis of mold-releasing agents. Compounds having a $C_8$-$C_{12}$ perfluoroalkyl group are most likely to develop mold release performance when used as mold-releasing agents. In particular, phosphonate compounds having a $C_8$ perfluorooctyl group and represented by the general formula:

$CF_3(CF_2)_7CH_2CH_2P(O)(OC_2H_5)_2$ are preferably used for this kind of application (see Patent Documents 4 to 7).

Incidentally, it is reported that phosphate or phosphonate compounds having a $C_8$-$C_{12}$ perfluoroalkyl group are biologically degraded in the environment and converted to compounds having relatively high bioaccumulation and environmental concentration, causing concerns for exposure during treatment processes, and for release or diffusion from waste, treated substrates, etc., into the environment. Moreover, compounds having a perfluoroalkyl group containing 14 or more carbon atoms are very difficult to handle because of their physical and chemical properties, and hence, such compounds are rarely used in practice.

Furthermore, as for phosphate or phosphonate compounds having a perfluoroalkyl group containing 8 or more carbon atoms, generation and mixing of perfluorooctanoic acids with high bioaccumulation potential is unavoidable during the production of these compounds. For these reasons, companies that produce such phosphate or phosphonate compounds have retreated from the production of the compounds or promoted the use of alternative compounds having a perfluoroalkyl group containing 6 or less carbon atoms.

However, compounds having a perfluoroalkyl group containing 6 or less carbon atoms cause a significant decrease in orientation on the surface of a treated substrate, and the melting point, glass transition point (Tg), etc., of the compounds are markedly lower than those of $C_8$ compounds. Accordingly, the compounds are highly influenced by their environmental conditions, such as temperature, humidity, stress, and contact with organic solvents. Consequently, the desired performance cannot be sufficiently achieved, and durability and other properties are affected.

PRIOR ART DOCUMENT

Patent Document

Patent Document 1: JP-B-53-23270
Patent Document 2: JP-B-53-23271
Patent Document 3: JP-B-57-48035
Patent Document 4: JP-B-2-45572
Patent Document 5: JP-B-3-78244
Patent Document 6: JP-B-4-4923
Patent Document 7: JP-B-4-11366
Patent Document 8: WO 2007/105633 A1

OUTLINE OF THE INVENTION

Problem to be Solved by the Invention

An object of the present invention is to provide an oligomer compound having a perfluoroalkyl group containing 6 or less carbon atoms, which is said to have low bioaccumulation potential, and having, when used as an active ingredient of a mold-releasing agent, mold release performance equivalent to that of a compound having a perfluoroalkyl group containing 8 or more carbon atoms; and to provide a mold-releasing agent comprising the same as an active ingredient.

Means for Solving the Problem

The present invention provides a graft copolymer in which a polyalkylene glycol or an alkyl ether thereof is graft-copolymerized with a polyfluoro-1-alkene represented by the general formula:

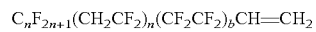

$C_nF_{2n+1}(CH_2CF_2)_a(CF_2CF_2)_bCH=CH_2$ wherein n is an integer of 1 to 6, a is an integer of 1 to 4, and b is an integer of 1 to 3; and also provides a mold-releasing agent comprising the same as an active ingredient.

Effect of the Invention

When released into the environment, the polyalkylene glycol (or alkyl ether)-polyfluoro-1-alkene graft copolymer of the present invention undergoes HF-elimination in the —$CH_2CF_2$— bonding site of the molecule, and a double bond is formed. The result is then subjected to ozone decomposition etc. to have a structure that is easily decomposed into a compound with low environmental concentration and low bioaccumulation potential. Moreover, the graft copolymer does not produce environmental loading substances (e.g., perfluoroalkyl carboxylic acids having 8 or more carbon atoms) in the production process thereof. Furthermore, the graft copolymer exhibits mold release performance equivalent to that of a mold-releasing agent comprising a compound having a perfluoroalkyl group containing 8 or more carbon atoms.

The graft copolymer exhibits effective mold release performance, for example, when it is applied as an aqueous or organic solvent type mold-releasing agent having a concentration of about 0.1 wt. % or less to an object to be subjected to a mold release treatment (e.g., a forming mold). This excellent effect is attributable to the extremely high solubility of the graft copolymer in solvents. Mold-releasing agents whose mold releasability is much more excellent than that of conventional mold-releasing agents, which are prepared to have solid matters content of 0.5 wt. %, can be obtained at solid matters content of about 0.1 wt. % or less.

Moreover, the excellent solubility of the graft copolymer in solvents facilitates the formation of mold-releasing agent solutions with uniform concentration. Accordingly, precipitation problematically formed in conventional mold-releasing agents does not occur, and good storage stability is ensured. For example, a graft copolymer wherein p+q is 10 or more, and q is 1 is soluble in water.

Owing to the above-described various properties of the graft copolymer, the mold-releasing agent comprising the graft copolymer as an active ingredient exhibits the following excellent effects:

(1) Film-forming properties are excellent, allowing the formation of uniform coating on molded products of a complicated shape.
(2) Tight adhesion to the mold surface due to the film-forming properties of the mold-releasing agent for the mold surface is excellent, significantly improving mold releasability and mold release life.
(3) Mold releasability and durability are excellent even after dilution to low concentration (e.g., about 0.1 wt. %), reducing mold contamination caused by the mold-releasing agent.
(4) Since the transfer of the mold-releasing agent to the molded product is low, the quality of the molded product after molding is less adversely affected, improving the dimensional precision of the molded product.
(5) The molded product does not lead to electrical contact failures, and has excellent secondary processability.

EMBODIMENTS FOR CARRYING OUT THE INVENTION

As the polyalkylene glycol or an alkyl ether thereof, which is to be the trunk polymer of the graft copolymer, a compound represented by the general formula:

$$R^1O-(RO)_{p+q}-R^2$$

RO: a $C_2$-$C_6$ linear or branched oxyalkylene group
$R^1$, $R^2$: each independently a hydrogen atom, a $C_1$-$C_{20}$ alkyl group, or an aralkyl group
p+q: the polymerization number of oxyalkylene groups (1 to 50) is used.

Specific examples thereof include polyethylene glycols, polypropylene glycols, polybutylene glycols, polyhexylene glycols, or their monoalkyl ethers, dialkyl ethers, etc., which have a number average molecular weight (Mn) of about 200 to 4,000.

On the other hand, the polyfluoro-1-alkene represented by the general formula:

$$C_nF_{2n+1}(CH_2CF_2)_a(CF_2CF_2)_bCH=CH_2 \quad [I]$$

which is to be graft-copolymerized with such a polyalkylene glycol (or alkyl ether) is produced as a product [I] by reacting a polyfluoroalkyl iodide represented by the general formula:

$$C_nF_{2n+1}(CH_2CF_2)_a(CF_2CF_2)_b(CH_2CH_2)I \quad [II]$$

with a basic compound to carry out a terminal HI-elimination reaction.

The HI-elimination reaction at position 1 is carried out by reacting the polyfluoroalkyl iodide [II] with an inorganic basic compound in the presence of a phase transfer catalyst, or by reacting the polyfluoroalkyl iodide [II] with a nitrogen-containing organic basic compound. The former method is preferably used, so that a polyfluoro-1-alkene having a purity as high as 99% is obtained with high yield. In this case, it is essential to use a phase transfer catalyst in combination with an inorganic basic compound. When no phase transfer catalyst is used, the III-elimination reaction can hardly proceed.

Examples of inorganic basic compounds include lithium hydroxide, sodium hydroxide, potassium hydroxide, magnesium hydroxide, calcium hydroxide, and other monovalent or divalent metal hydroxides; sodium carbonate, sodium hydrogen carbonate, potassium carbonate, potassium hydrogen carbonate, and other monovalent or divalent metal carbonates; and the like. As a phase transfer catalyst to be used in combination with such an inorganic basic compound, a quaternary onium salt, such as a quaternary ammonium salt or quaternary phosphonium salt, or Crown ether, is used at a ratio of about 0.01 to 10 mol %, preferably about 0.1 to 3 mol %, based on the inorganic basic compound.

Examples of nitrogen-containing organic basic compounds include diethylamine, triethylamine, pyridine or derivatives thereof, diethanolamine, triethanolamine, 1,8-diazabicyclo[5.4.0]-7-undecene, diazabicyclononene, and the like. Preferably, 1,8-diazabicyclo[5.4.0]-7-undecene having low nucleophilicity is used.

When a nitrogen-containing organic basic compound is used, a large amount of polyfluoroalkadiene mixture is produced as a by-product, in addition to the target polyfluoro-1-alkene; however, the polyfluoro-1-alkene and the polyfluoroalkadiene mixture can be separated by fractional distillation based on the difference in vapor temperature during distillation under reduced pressure.

Such an inorganic or organic basic compound is used in a molar ratio of about 0.1 to 10, preferably 0.95 to 2.5, more preferably 1.0 to 1.5, based on the polyfluoroalkyl iodide [II]. When the amount of basic compound is less than this range, the desired HI-elimination reaction does not proceed smoothly; whereas when the amount of basic compound is more than this range, the removal of the basic compound becomes difficult, and side reactions occur, resulting in an increased amount of waste.

Although the HI-elimination reaction can be carried out in the absence of a solvent, the reaction is preferably carried out in the presence of an aqueous solvent or an organic solvent in terms of reaction efficiency and control of heating generation. Generally, water is used as an aqueous solvent. Examples of organic solvents include alcohols, such as methanol, ethanol, propanol, and isopropanol; ethers, such as diethyl ether, 1,4-dioxane, and tetrahydrofuran; ketones, such as acetone, methyl ethyl ketone, and methyl isobutyl ketone; hydrocarbons, such as toluene and cyclohexane; aprotic polar solvents, such as acetonitrile, N,N-dimethylformamide, N,N-diethylformamide, N,N-dimethylacetamide, N,N-diethylacetamide, and N-methyl-2-pyrrolidone; and fluorine-containing organic solvents, such as hydrochlorofluorocarbon (e.g., HCFC-225) and hydrofluoroether (e.g., Novec HFE, manufactured by 3M).

An aqueous solvent or an organic solvent is used in a volume ratio of about 0.1 to 100, preferably about 1 to 10, more preferably 3 to 6, based on the polyfluoroalkyl iodide [II]. However, a larger amount of solvent does not affect the reaction efficiency, and thus the solvent is preferably used in a volume ratio of 3 to 6.

The HI-elimination reaction is carried out at about −20 to 100° C., preferably about −10 to 80° C. At temperatures higher than this range, side reactions proceed, generating a large amount of by-products with an unknown structure. The reaction may be carried out under reduced pressure, atmospheric pressure, or increased pressure; in terms of ease of handling the reaction apparatus, the reaction is preferably carried out under atmospheric pressure.

In a case where static phase separation is performed after the reaction is completed, the separated organic layer is washed with water, for example, to remove the basic compound, and purification is then performed by distillation etc., according to a standard method, thereby obtaining the target polyfluoro-1-alkene. For example, in a case where a polar solvent is used instead of performing static phase separation, the solvent is distilled off under reduced pressure, followed by the same treatment as in the case where static phase separation is carried out.

The polyfluoroalkyl iodide [II] is obtained by the addition reaction of terminally iodized polyfluoroalkane with ethylene. Examples of terminally iodized polyfluoroalkane include the following compounds:

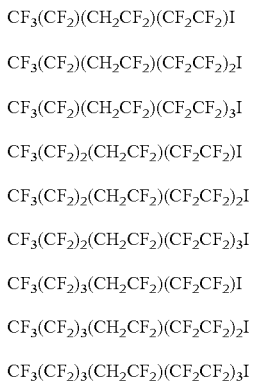

The polyfluoroalkyl iodide [II] can be produced by the addition reaction of a terminally iodized compound represented by the general formula: $C_nF_{2n+1}(CH_2CF_2)_a(CF_2CF_2)_bI$ [A] with ethylene. The ethylene addition reaction is carried out in such a manner that the compound [A] above is subjected to an addition reaction with pressurized ethylene in the presence of a peroxide initiator. The number of addition is 1 or more, preferably 1, although depending on the reaction conditions. Although the reaction temperature depends on the degradation temperature of the initiator used, the reaction is generally conducted at about 80 to 120° C.; when a peroxide initiator that decomposes at a low temperature is used, the reaction can be conducted at 80° C. or below. As a peroxide initiator, tert-butyl peroxide, di(tert-butylcyclohexyl)peroxydicarbonate, dicetyl peroxydicarbonate, or the like may be used at a ratio of about 1 to 5 mol %, based on the compound [A].

The polyfluoroalkyl iodide [II] is reacted with a basic compound to carry out dehydrohalogenation, thereby resulting in an HI-elimination reaction at position 1. Thus, the polyfluoro-1-alkene [I] is produced, as described above.

The graft copolymerization of the polyfluoro-1-alkene [I] with the polyalkylene glycol or its alkyl ether trunk polymer is carried out so that the F content derived from the polyfluoro-1-alkene [I] is about 3 to 70 wt. %, preferably about 5 to 45 wt. %, in the obtained graft copolymer, in terms of solvent solubility and mold release performance. Generally, the polyfluoro-1-alkene [I] is used at a feed molar ratio of 1.0 to 20, preferably 1.0 to 5.0, based on the polyalkylene glycol (or alkyl ether).

The graft copolymerization between the both is carried out by heating to a temperature of about 80 to 180° C. optionally in the presence of a solvent (e.g., benzene), using generally used peroxide- or azo-based radical initiators. As a result, a graft copolymer in which the polyfluoro-1-alkene is presumably graft-copolymerized with the alkylene glycol group at one end can be obtained.

When a compound of the general formula:

is used as the polyalkylene glycol (or alkyl ether), the resulting product is represented by the general formula:

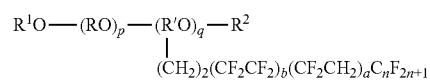

wherein p is the number of oxyalkylene groups that are not graft-copolymerized, q is the number of oxyalkylene groups that are graft-copolymerized, and p+q is generally 1 to 50, preferably 10 to 50.

The obtained graft copolymer is used as a mold-releasing agent in the form of a solution or dispersion of water, an aqueous medium, or an organic medium. Examples of organic media include aromatic hydrocarbons, such as xylene and toluene; alcohols, such as methanol, ethanol, and isopropanol; ketones, such as acetone and methyl ethyl ketone; esters, such as ethyl acetate and butyl acetate; halogenated hydrocarbons, such as methyl chloroform, xylene hexafluoride, and 1,1,2-trichloro-1,2,2-trifluoroethane; and the like. Using such an organic medium, a mold-releasing agent is prepared as a graft copolymer having a concentration of about 0.01 to 30 wt. %, preferably about 0.05 to 3 wt. %. Moreover, when water or an aqueous medium in which water is mixed with water-soluble organic solvents, such as alcohols and ketones, is used, a mold-releasing agent is prepared as an aqueous solution or dispersion in which the graft copolymer is dispersed at the same concentration.

The mold-releasing agent comprising the graft copolymer as an active ingredient, which is prepared as a solution or dispersion of water, an aqueous medium, or an organic medium, as described above, can be applied to a mold surface by spray coating, brushing, immersing, or other method. In addition, the mold-releasing agent can also be applied to materials other than the mold surface. For example, when the mold-releasing agent is applied to a rubber compound surface, adhesion of the compound can be effectively prevented.

EXAMPLES

The following describes the present invention with reference to Examples.

Reference Example 1

(1) In a 1,200-ml autoclave equipped with a stirrer and a thermometer, 603 g (0.99 mol) of a compound of the formula:

and 7 g of di-tert-butyl peroxide were charged, and the autoclave was degassed by a vacuum pump. After the internal temperature was raised to 80° C. by heating, ethylene was sequentially introduced so that the internal pressure was 0.5 MPa. When the internal pressure dropped to 0.2 MPa, ethylene was introduced again to return the pressure to 0.5 MPa; this operation was repeated. While maintaining the internal temperature at 80 to 115° C., 41 g (1.45 mol) of ethylene was introduced over about 3 hours. The content was collected at an internal temperature of 50° C. or less, thereby obtaining 637 g (yield: 98.8%) of a compound of the formula:

$CF_3(CF_2)_3(CH_2CF_2)(CF_2CF_2)_2(CH_2CH_2)I(98GC\%)$, i.e., the general formula:

$C_4F_9CH_2(CF_2)_5CH_2CH_2I$.

(2) In a 50-ml glass reactor equipped with a cooling condenser, a thermocouple, and a magnet stirrer, 5 g (7.8 mmol) of 3,3,4,4,5,5,6,6,7,7,9,9,10,10,11,11,12,12,12-nonadecafluoro-1-iodododecane of the formula: $C_4F_9CH_2(CF_2)_5CH_2CH_2I$ obtained in step (1) above was suspended in an aqueous solution in which 0.34 g (8.5 mmol) of sodium hydroxide and 0.03 g (0.13 mmol) of tetrabutylammonium chloride were dissolved in 15 ml of water. The mixture was reacted by continuous stirring for about 72 hours at room temperature.

After the reaction was completed, the lower layer obtained by static phase separation was washed twice with 20 ml of water and then once with a saturated saline solution. The obtained reaction product solution was dehydrated and dried over anhydrous magnesium sulfate. The recovered solution was purified by distillation under reduced pressure, thereby obtaining 3.2 g (yield: 83%) of a product, i.e., polyfluoro-1-alkene A, as a fraction with a vapor temperature of 76 to 77° C./1 kPa (purity: 99%). The structure of the obtained fraction was determined by $^1$H-NMR and $^{19}$F-NMR.

Product A: 3,3,4,4,5,5,6,6,7,7,9,9,10,10,11,11,12,12,12-nonadecafluoro-1-dodecene $CF_3CF_2CF_2CF_2CH_2CF_2CF_2CF_2CF_2CF_2CH=CH_2$ $^1$H-NMR; δ=2.90 (2H: —$CH_2$—), 5.79 (1H: —$CF_2$—CH=), 5.97 (2H: =$CH_2$)

$^{19}$F-NMR; δ=−82.02 (3F: $CF_3$—), −113.04 (4F: —$CF_2CH_2$—), −114.79 (2F: —$CF_2CH$=), −121.9 to −128.2 (10F: —$CF_2$—)

Reference Examples 2 to 5

(1) In Reference Example 1, the starting material (polyfluoro-1-iodoalkane) was changed to various compounds, thereby obtaining corresponding products, i.e., polyfluoro-1-alkenes B to E.

| Ref. Ex. | Starting material | Polyfluoro-1-alkane | Abbrev. |
|---|---|---|---|
| 1 | $CF_3(CF_2)_3CH_2(CF_2)_5(CH_2)_2I$ | $CF_3(CF_2)_3CH_2(CF_2)_5CH=CH_2$ | A |
| 2 | $CF_3(CF_2)_3CH_2(CF_2)_3(CH_2)_2I$ | $CF_3(CF_2)_3CH_2(CF_2)_3CH=CH_2$ | B |
| 3 | $CF_3CF_2CH_2(CF_2)_7(CH_2)_2I$ | $CF_3CF_2CH_2(CF_2)_7CH=CH_2$ | C |
| 4 | $CF_3CF_2CH_2(CF_2)_5(CH_2)_2I$ | $CF_3CF_2CH_2(CF_2)_5CH=CH_2$ | D |
| 5 | $CF_3CF_2CH_2(CF_2)_3(CH_2)_2I$ | $CF_3CF_2CH_2(CF_2)_3CH=CH_2$ | E |

Example 1

In a 300-ml reactor equipped with a stirrer, a reflux device, and a thermometer, 200 g (0.10 mol) of polyethylene glycol monomethyl ether (Mn: 2,012, p+q: about 45, melting point: 48° C.) was charged. After the temperature was raised to 70° C., the air in the reactor was replaced by nitrogen gas for 30 minutes. Thereafter, the temperature was raised to 145° C., and 1.25 g of di-tert-butyl peroxide was added, followed by stirring for 5 minutes. Then, 56 g (0.11 mol) of polyfluoro-1-alkene A was added dropwise over 2 hours, and the mixture was reacted at that temperature for 24 hours.

After the reaction was completed, unreacted polyfluoro-1-alkene A, initiator decomposition products, etc., were distilled off under reduced pressure, thereby obtaining 235 g (yield: 92%) of light yellow, wax-state graft copolymer I. The structure of the obtained copolymer I was determined by $^1$H-NMR and $^{19}$F-NMR.

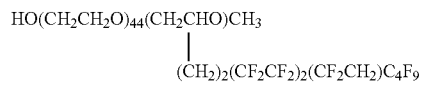

$^1$H-NMR; δ=1.74 (2H: —$CF_2CH_2CH_2$—), 2.25 (2H: —$CF_2CH_2CH_2$—), 2.9 (2H: —$CF_2CH_2CF_2$—), 3.25 (3H: —$OCH_3$), 3.2 to 3.7 (179H: —$OCH_2CH_2O$—, —$OCH_2CH$—)

$^{19}$F-NMR; δ=−82.0 (3F: $CF_3$—), −113.1 (4F: —$CF_2CH_2CF_2$), −114.5 (2F: —$CF_2CF_2CH_2CH_2$—), −121.9 to −127.0 (10F: –$CF_2$—)

Examples 2 to 7

In Example 1, the type and amount of polyalkylene glycol-based compound [PAG] were changed in various ways, and the type and amount of polyfluoro-1-alkene [PFA] were also changed in various ways, thereby obtaining graft copolymers II to VII.

Polyalkylene glycol-based compound [PAG]: $R^1O—(RO)_{p+q}—R^2$

| | |
|---|---|
| a: $HO(CH_2CH_2O)_{p+q}CH_3$ | p + q: about 45 |
| b: $HO(CH_2CH_2O)_{p+q}CH_3$ | p + q: about 20 |
| c: $HO(CH_2CH_2O)_{p+q}H$ | p + q: about 20 |
| d: $CH_3O(CH_2CH_2O)_{p+q}CH_3$ | p + q: about 45 |
| e: $HO[CH_2CH(CH_3)O]_{p+q}CH_3$ | p + q: about 14 |
| f: $HO[CH_2CH(CH_3)O]_{p+q}(CH_2)_3CH_3$ | p + q: about 14 |

Table 1 below shows the obtained results, including the results of Example 1. The produced graft copolymers are represented by the following general formula. The number q of graft-copolymerized oxyalkylene groups was determined by $^1$H-NMR.

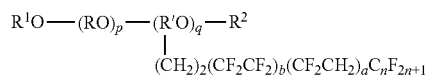

RO: an oxyalkylene group
R'O: an oxyalkylene group from which one hydrogen atom was removed for graft copolymerization

TABLE 1

| | Example | | | | | | |
|---|---|---|---|---|---|---|---|
| | 1 | 2 | 3 | 4 | 5 | 6 | 7 |
| [PAG] | | | | | | | |
| Type | a | b | a | c | d | e | f |
| Amount (g) | 200 | 90 | 200 | 88 | 200 | 83 | 87 |
| Amount (mol) | 0.10 | 0.10 | 0.10 | 0.10 | 0.10 | 0.10 | 0.10 |
| [PFA] | | | | | | | |
| Type | A | B | E | C | A | D | A |
| Amount (g) | 56 | 90 | 34 | 168 | 56 | 90 | 112 |
| Amount (mol) | 0.11 | 0.22 | 0.11 | 0.33 | 0.11 | 0.22 | 0.22 |
| [Product] | | | | | | | |
| Type | I | II | III | IV | V | VI | VII |
| p | 44 | 18 | 44 | 17 | 44 | 12 | 12 |
| q | 1 | 2 | 1 | 3 | 1 | 2 | 2 |
| Recovered amount (%) | 235 | 165 | 225 | 238 | 247 | 160 | 180 |
| Yield (%) | 92 | 92 | 96 | 93 | 96 | 92 | 90 |
| F content (%) | 15 | 34 | 9 | 45 | 14 | 35 | 40 |

Example 8

The graft copolymer I (0.5 parts by weight) obtained in Example 1 was added to 99.5 parts by weight of ion exchange water to prepare a mold-releasing agent aqueous solution. Using the mold-releasing agent aqueous solution, mold releasability was evaluated by the following two measurement methods. The results were such that mold releasability was 6 N, and mold release life was 10 times. In contrast, mold releasability and mold release life were evaluated without applying the mold-releasing agent aqueous solution. The results were such that the mold releasability could not be measured because the molded product was not removed from the mold, and the mold release life was therefore 0 times.
<Evaluation of Mold Releasability and Mold Release Life>

Polyurethane prepolymer (100 parts by weight; Coronate C-4090, manufactured by Nippon Polyurethane Industry Co., Ltd.), which had been heated to 80° C., and 12.8 parts by weight of methylene-bis-o-chloroaniline curing agent (Iharacuamine MT, manufactured by Ihara Chemical Industry Co., Ltd.), which had been heat-melted, were mixed by stirring without forming air bubbles. The mixture was poured into an aluminum mold (diameter: 45 mm, depth: 50 mm) to which the above mold-releasing agent aqueous solution had been applied by spraying, and which had been preheated to 80° C. A hook was stood in the center of the space of the mold for removing the cured molded product. After heat-curing at 120° C. for 1 hour, the molded product was taken out from the mold by pulling the hook. The mold release load required to pull the hook was regarded as mold releasability. After the mold releasability was thus determined, mold release life was determined by measuring how many times a one-time application of the mold-releasing agent aqueous solution allowed mold releasing at a mold release load of 50 N or less.

Examples 9 to 14

In the preparation of the mold-releasing agent aqueous solution of Example 8, each of the graft copolymers II to VII was used in place of the graft copolymer I.

Example 15

In the preparation of the mold-releasing agent aqueous solution of Example 8, 14.5 parts by weight in 99.5 parts by weight of the total ion exchange water was replaced by methanol, and a mold-releasing agent aqueous solution was prepared and used.

Example 16

In the preparation of the mold-releasing agent aqueous solution of Example 8, 86 parts by weight of 1,4-bis(trifluoromethyl)benzene and 13.5 parts by weight of isopropanol were used in place of 99.5 parts by weight of ion exchange water, and a mold-releasing agent organic solvent solution was prepared and used.

Table 2 below shows the evaluation results of mold releasability obtained in the Examples.

TABLE 2

| Ex. | Graft copolymer | Mold releasability (N) | Mold release life (time) |
|---|---|---|---|
| 8 | I | 6.0 | 10 |
| 9 | II | 5.0 | 15 |
| 10 | III | 10.0 | 7 |
| 11 | IV | 4.0 | 16 |
| 12 | V | 6.2 | 11 |
| 13 | VI | 5.2 | 14 |
| 14 | VII | 5.0 | 11 |
| 15 | I | 6.1 | 12 |
| 16 | I | 6.2 | 10 |

The invention claimed is:

1. A graft copolymer in which a polyalkylene glycol or an alkyl ether thereof is graft-copolymerized with a polyfluoro-1-alkene represented by the general formula:

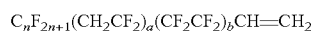

$C_nF_{2n+1}(CH_2CF_2)_a(CF_2CF_2)_bCH=CH_2$ wherein n is an integer of 1 to 6, a is an integer of 1 to 4, and b is an integer of 1 to 3.

2. The graft copolymer according to claim 1, which uses, as a trunk polymer, a polyalkylene glycol represented by the general formula:

$R^1O-(RO)_{p+q}-R^2$ wherein RO is a linear or branched oxyalkylene group having 2 to 6 carbon atoms, $R^1$ and $R^2$ are each independently a hydrogen atom, an alkyl group having 1 to 20 carbon atoms, or an aralkyl group, and p+q is the number of oxyalkylene groups and is an integer of 1 to 50, or an alkyl ether thereof; and which produces a product represented by the general formula:

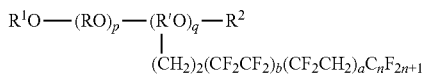

wherein RO, $R^1$, $R^2$, and n are as defined above, R'O is a graft-copolymerized oxyalkylene group, p is the number of oxyalkylene groups that are not graft-copolymerized, and q is the number of oxyalkylene groups that are graft-copolymerized.

3. The graft copolymer according to claim 1, which has a fluorine content of 3 to 70 wt. %.

4. A mold-releasing agent comprising the graft copolymer according to claim 1, as an active ingredient.

5. The mold-releasing agent according to claim 4, which is prepared as a solution or dispersion of water, an aqueous medium, or an organic solvent.

6. The mold-releasing agent according to claim 5, which is applied to a molding mold for use.

7. A mold-releasing agent comprising the graft copolymer according to claim 2, as an active ingredient.

8. A mold-releasing agent comprising the graft copolymer according to claim 3, as an active ingredient.

9. The mold-releasing agent according to claim 7, which is prepared as a solution or dispersion of water, an aqueous medium, or an organic solvent.

10. The mold-releasing agent according to claim 8, which is prepared as a solution or dispersion of water, an aqueous medium, or an organic solvent.

11. The mold-releasing agent according to claim 9, which is applied to a molding mold for use.

12. The mold-releasing agent according to claim 10, which is applied to a molding mold for use.

* * * * *

UNITED STATES PATENT AND TRADEMARK OFFICE
CERTIFICATE OF CORRECTION

PATENT NO. : 8,377,187 B2
APPLICATION NO. : 13/376321
DATED : February 19, 2013
INVENTOR(S) : Kaneumi et al.

It is certified that error appears in the above-identified patent and that said Letters Patent is hereby corrected as shown below:

In the Specification

Column 7, lines 36-40, delete
"$^1$H-NMR; δ=2.90 (2H: —CH$_2$—), 5.79 (1H: —CF$_2$—CH=), 5.97 (2H: =CH$_2$)
$^{19}$F-NMR; δ=-82.02 ) (3F: CF$_3$—), -113.04 (4F: —CF$_2$CH$_2$—), -114.79 (2F: —CF$_2$CH=), -121.9 to -128.2 (10F: —CF$_2$—)"

and insert with

--$^1$H-NMR; δ=2.90 (2H: —C$\underline{H}_2$—, 5.79 (1H: —CF$_2$—C$\underline{H}$=), 5.97 (2H: =C$\underline{H}_2$)
$^{19}$F-NMR; δ=-82.02 ) (3F: C$\underline{F}_3$—), -113.04 (4F: —C$\underline{F}_2$CH$_2$—), -114.79 (2F: —C$\underline{F}_2$CH=), -121.9 to -128.2 (10F: —C$\underline{F}_2$—)--

Column 8, lines 18-24, delete
"$^1$H-NMR; δ-1.74 (2H: —CF$_2$CH$_2$CH$_2$—), 2.25 (2H: —CF$_2$CH$_2$CH$_2$—), 2.9 (2H: —CF$_2$CH$_2$CF$_2$—), 3.25 (3H: —OCH$_3$, 3.2 to 3.7 (179H: —OCH$_2$CH$_2$O—, —OCH$_2$CH—)
$^{19}$F-NMR; δ=-82.0 (3F: CF$_3$—), -113.1 (4F: —CF$_2$CH$_2$CF$_2$), -114.5 (2F: —CF$_2$CF$_2$CH$_2$CH$_2$—), -121.9 to -127.0 (10F: —CF$_2$—)"

and insert with

Signed and Sealed this
Third Day of November, 2015

Michelle K. Lee
*Director of the United States Patent and Trademark Office*

--$^1$H-NMR; δ=1.74 (2H: —CF$_2$CH$_2$C$\underline{H}_2$—), 2.25 (2H: —CF$_2$C$\underline{H}_2$CH$_2$—), 2.9 (2H: —CF$_2$C$\underline{H}_2$CF$_2$—), 3.25 (3H: —OC$\underline{H}_3$), 3.2 to 3.7 (179H: —OC$\underline{H}_2$C$\underline{H}_2$O—, —OC$\underline{H}_2$C$\underline{H}$—)

$^{19}$F-NMR; δ=-82.0 (3F: C$\underline{F}_3$—), -113.1 (4F: —C$\underline{F}_2$CH$_2$C$\underline{F}_2$), -114.5 (2F: —CF$_2$C$\underline{F}_2$CH$_2$CH$_2$—), -121.9 to -127.0 (10F: -C$\underline{F}_2$—)--